(12) United States Patent
Mitchell et al.

(10) Patent No.: US 8,963,691 B1
(45) Date of Patent: Feb. 24, 2015

(54) SENSOR ASSOCIATION SYSTEM USING WIRELESS DEVICE INFORMATION

(75) Inventors: Bradley James Mitchell, Snohomish, WA (US); Trevor Milton Laib, Woodinville, WA (US); Henry VanRensselaer Fletcher, III, Everett, WA (US)

(73) Assignee: The Boeing Company, Chicago, IL (US)

( * ) Notice: Subject to any disclaimer, the term of this patent is extended or adjusted under 35 U.S.C. 154(b) by 903 days.

(21) Appl. No.: 12/844,309

(22) Filed: Jul. 27, 2010

(51) Int. Cl.
*H04Q 9/00* (2006.01)

(52) U.S. Cl.
USPC .................. 340/10.42; 340/945; 340/539.22

(58) Field of Classification Search
CPC ........................................................ H04Q 9/00
USPC .................. 340/10.42, 945, 286.02, 539.22, 340/539.26, 506
See application file for complete search history.

(56) References Cited

U.S. PATENT DOCUMENTS

| | | |
|---|---|---|
| 3,715,741 A | 2/1973 | McWade et al. |
| 3,781,853 A | 12/1973 | Jacobs |
| 3,787,867 A | 1/1974 | Dodge et al. |
| 3,828,334 A | 8/1974 | Wallace |
| 4,024,491 A | 5/1977 | Pellerin et al. |
| 4,389,632 A | 6/1983 | Seidler |
| 4,451,822 A | 5/1984 | Verse et al. |
| 4,581,606 A | 4/1986 | Mallory |
| 4,620,190 A | 10/1986 | Tigwell et al. |
| 5,552,767 A | 9/1996 | Toman |
| 6,008,727 A * | 12/1999 | Want et al. ................. 340/572.1 |
| 6,434,391 B1 | 8/2002 | Rutan |
| 6,591,296 B1 | 7/2003 | Ghanime |
| 6,690,282 B2 | 2/2004 | Miyashita et al. |
| 6,710,719 B1 * | 3/2004 | Jones et al. ..................... 340/8.1 |
| 6,822,582 B2 | 11/2004 | Voeller et al. |
| 6,867,710 B2 | 3/2005 | Wobben |
| 7,019,640 B2 | 3/2006 | Canich et al. |
| 7,030,760 B1 | 4/2006 | Brown |
| 7,398,932 B2 | 7/2008 | Ashili et al. |
| 2002/0057192 A1 | 5/2002 | Eagleson et al. |
| 2003/0080860 A1 * | 5/2003 | Stewart et al. ................ 340/442 |
| 2003/0097302 A1 | 5/2003 | Overhultz et al. |
| 2004/0233055 A1 | 11/2004 | Canich et al. |
| 2004/0246900 A1 * | 12/2004 | Zhang et al. .................. 370/238 |
| 2005/0110674 A1 | 5/2005 | Mendolia et al. |
| 2005/0253722 A1 | 11/2005 | Droms et al. |
| 2006/0044112 A1 | 3/2006 | Bridgelall |
| 2006/0071790 A1 | 4/2006 | Duron et al. |
| 2007/0109100 A1 | 5/2007 | Jett et al. |
| 2007/0114280 A1 | 5/2007 | Coop et al. |
| 2007/0152815 A1 * | 7/2007 | Meyers et al. ........... 340/539.22 |
| 2007/0200712 A1 | 8/2007 | Arneson et al. |
| 2007/0239862 A1 * | 10/2007 | Bronez et al. ................ 709/223 |
| 2007/0241908 A1 * | 10/2007 | Coop ......................... 340/572.8 |

(Continued)

OTHER PUBLICATIONS

PCT search report dated Dec. 2, 2011 regarding application PCT/US2011/041908, filing date Jun. 24, 2011, applicant The Boeing Company, 9 Pages.

(Continued)

*Primary Examiner* — Edwin Holloway, III
(74) *Attorney, Agent, or Firm* — Yee & Associates, P.C.

(57) ABSTRACT

A method, apparatus, and computer program product for identifying wireless devices. Information is received from a wireless device that is unidentified. An object associated with the wireless device is identified using a number of types of information in the information and the information.

20 Claims, 8 Drawing Sheets

(56) References Cited

U.S. PATENT DOCUMENTS

| | | |
|---|---|---|
| 2008/0129037 A1 | 6/2008 | Roth et al. |
| 2008/0150747 A1 | 6/2008 | Eren et al. |
| 2008/0157972 A1 | 7/2008 | Duron et al. |
| 2008/0238621 A1 | 10/2008 | Rofougaran et al. |
| 2008/0238630 A1 | 10/2008 | Chen et al. |
| 2009/0099943 A1 | 4/2009 | Bodin et al. |
| 2009/0322488 A1 | 12/2009 | Kanagala et al. |
| 2009/0322551 A1 | 12/2009 | Kanagala et al. |
| 2010/0079237 A1* | 4/2010 | Falk et al. ............... 340/5.8 |
| 2010/0106624 A1* | 4/2010 | Ashrafzadeh et al. ......... 705/28 |
| 2010/0141402 A1 | 6/2010 | Eun et al. |
| 2010/0164723 A1 | 7/2010 | Shiau et al. |
| 2010/0214078 A1 | 8/2010 | Chen et al. |
| 2010/0237994 A1 | 9/2010 | Carraher et al. |
| 2012/0019399 A1 | 1/2012 | Vargo et al. |
| 2012/0026016 A1 | 2/2012 | Mitchell et al. |
| 2012/0044092 A1 | 2/2012 | Shore et al. |
| 2012/0194322 A1 | 8/2012 | Batra |

OTHER PUBLICATIONS

Related U.S. Appl. No. 12/844,361, filed Jul. 27, 2010, 50 Pages.
Office Action dated Jun. 8, 2012 regarding U.S. Appl. No. 12/844,361, 14 pages.
U.S. Appl. No. 12/844,361, filed Jul. 27, 2010, Mitchell et al.
Office Action, dated Mar. 14, 2013, regarding U.S. Appl. No. 12/844,361, 21 pages.
Final Office Action, dated May 21, 2014, regarding U.S. Appl. No. 12/844,361, 36 pages.
Office Action, dated Nov. 6, 2014, regarding U.S. Appl. No. 12/844,361, 15 pages.

* cited by examiner

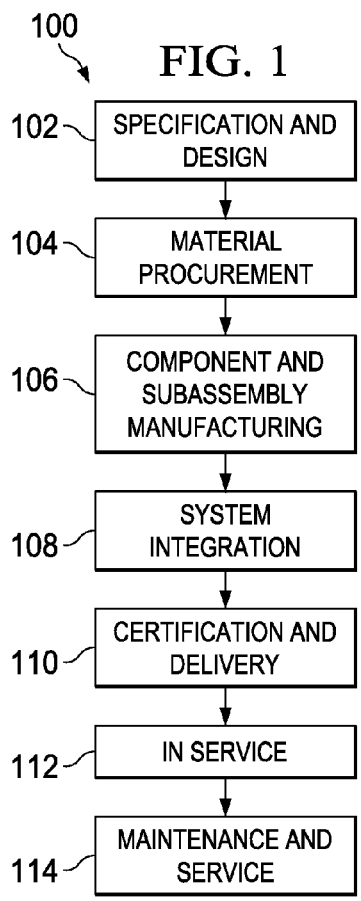
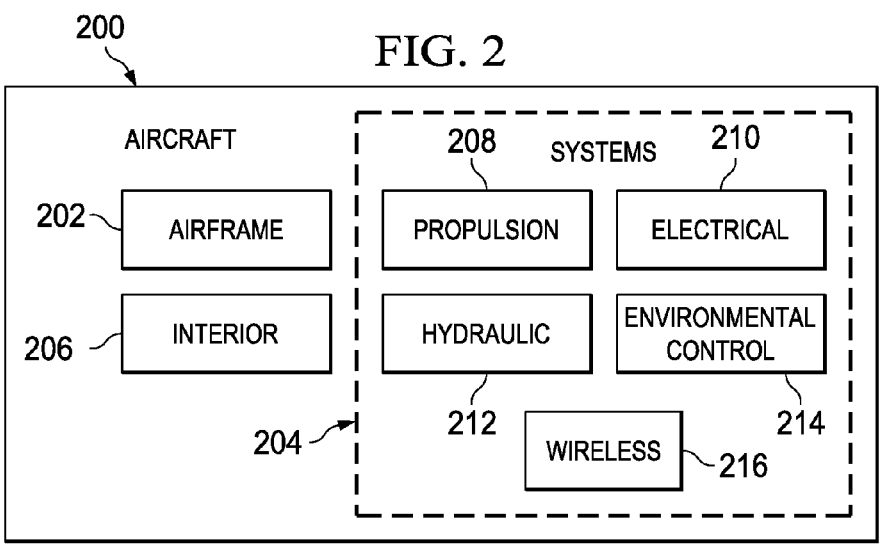

FIG. 8

| IDENTIFIER | FUNCTION | MATCHING CRITERIA | ROUTE TO |
|---|---|---|---|
| S1234 | LEFT BLEED AIR DUCT OVERHEAT SENSOR | MANUFACTURER = "XYZ Corp." OR "ABC Ltd.", AND PART NUMBER = "123-4321" AND DATA TYPE INCLUDES "temp", AND RSSI FROM LEFT WING ROUTER > -60 db, AND RSSI FROM RIGHT WING ROUTER < -70 db | CABIN PRESSURIZATION CONTROL UNIT |
| S5678 | RIGHT BLEED AIR DUCT OVERHEAT SENSOR | MANUFACTURER = "XYZ Corp." OR "ABC Ltd.", AND PART NUMBER = "123-4321" AND DATA TYPE INCLUDES "temp", AND RSSI FROM RIGHT WING ROUTER > -60 db, AND RSSI FROM LEFT WING ROUTER < -70 db | CABIN PRESSURIZATION CONTROL UNIT |
| S111 | FWD CABIN TEMPERATURE SENSOR | MANUFACTURER = "XYZ Corp." OR "ABC Ltd.", AND PART NUMBER = "123-4321" AND DATA TYPE INCLUDES "temp", AND RSSI FROM FWD CABIN ROUTER > -60 db, AND RSSI FROM MID CABIN ROUTER < -70 db | CABIN A/C AND TEMPERATURE CONTROLLER |
| S112 | MID CABIN TEMPERATURE SENSOR | MANUFACTURER = "XYZ Corp." OR "ABC Ltd.", AND PART NUMBER = "123-4321" AND DATA TYPE INCLUDES "temp", AND RSSI FROM MID CABIN ROUTER > -60 db, AND RSSI FROM FWD CABIN ROUTER < -70 db AND RSSI FROM AFT CABIN ROUTER < -70 db | CABIN A/C AND TEMPERATURE CONTROLLER |
| S113 | AFT CABIN TEMPERATURE SENSOR | MANUFACTURER = "XYZ Corp." OR "ABC Ltd.", AND PART NUMBER = "123-4321" AND DATA TYPE INCLUDES "temp", AND RSSI FROM AFT CABIN ROUTER > -60 db, AND RSSI FROM MID CABIN ROUTER < -70 db | CABIN A/C AND TEMPERATURE CONTROLLER |

SENSOR ASSOCIATION SYSTEM USING WIRELESS DEVICE INFORMATION

CROSS-REFERENCE TO RELATED APPLICATION

This application is related to the following patent application: entitled "Wireless Device Association System", Ser. No. 12/844,361; filed Jul. 27, 2010, assigned to the same assignee, and incorporated herein by reference.

BACKGROUND INFORMATION

1. Field:

The present disclosure relates generally to aircraft and, in particular, to wireless systems in aircraft. Still more particularly, the present disclosure relates to a method and apparatus for associating wireless devices to objects within an aircraft using data sent from the sensors.

2. Background:

Sensor systems are present in most aircraft. A sensor system contains sensors. These sensors are used to monitor various objects for the aircraft. These objects include, for example, without limitation, an in-flight entertainment system, a hydraulic system, landing gear, a tire, an engine inlet, an actuator, an air vent, a portion of a passenger cabin, a fuel tank, and other suitable types of objects.

The sensors transmit data to a data processing system. The data processing system may then analyze the data, or route the data to other data processing systems. For example, the data processing system receiving data from the sensors in the sensor system may route the data to a flight management system. In some cases, the data may be transmitted off the aircraft to a ground location or other aircraft.

In many aircraft, the sensors in a sensor system are connected to the data processing system in the sensor system through wires. With these types of sensor systems, each sensor is associated with an object in the aircraft. For example, different objects may be associated with a functional equipment designator. This type of identifier is typically a letter followed by up to six numbers.

These equipment designators are used in wire diagrams, equipment installation diagrams, block diagrams, wired definition databases, maintenance manuals, and other sources of aircraft information. When a sensor is installed or replaced, the wiring diagrams allow for an association of particular sensors with the object. In this manner, a wire from a sensor to a particular port in a data processing system is used to identify the sensor with the particular object.

With a desire to reduce the complexity of aircraft, the weight of aircraft, and the costs, wired sensor systems, in some cases, have been replaced with wireless sensor systems. With these types of sensor systems, a wireless sensor transmits information to a data processing system in the sensor system through a wireless connection. The wireless connection may be direct, or use one or more routers.

With these types of sensor systems, an association of a wireless sensor with a port through a wiring diagram cannot be made. As a result, associating a particular wireless sensor with an object in the aircraft may be difficult to perform such that the identification supports intended airplane functions. As a result, the use of wireless sensors in some portion of an aircraft may be unfeasible without an ability to easily identify information from a particular wireless sensor with a particular object.

Therefore, it would be advantageous to have a method and apparatus that takes into account some of the issues discussed above, as well as possibly other issues.

SUMMARY

In one advantageous embodiment, a method is provided for identifying wireless devices. Information is received from a wireless device that is unidentified. An object associated with the wireless device is identified using a number of types of information in the information and the information.

In another advantageous embodiment, an apparatus comprises a processor unit, a storage device, and program code stored on the storage device. The processor unit is configured to run the program code to receive information from a wireless device that is unidentified. The processor unit is configured to run the program code to identify an object associated with the wireless device using a number of types of information in the information and the information.

In yet another advantageous embodiment, a computer program product for identifying wireless devices comprises a computer readable storage medium and program code, stored on the computer readable storage medium. Program code is present for receiving information from a wireless device that is unidentified. Program code is present for identifying an object associated with the wireless device using a number of types of information in the information and the information.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 1 is an illustration of an aircraft manufacturing and service method in accordance with an advantageous embodiment;

FIG. 2 is an illustration of an aircraft in which an advantageous embodiment may be implemented;

FIG. 8 is an illustration of a table for routing information received from wireless sensor units in accordance with an advantageous embodiment;

DETAILED DESCRIPTION

Figure 3:
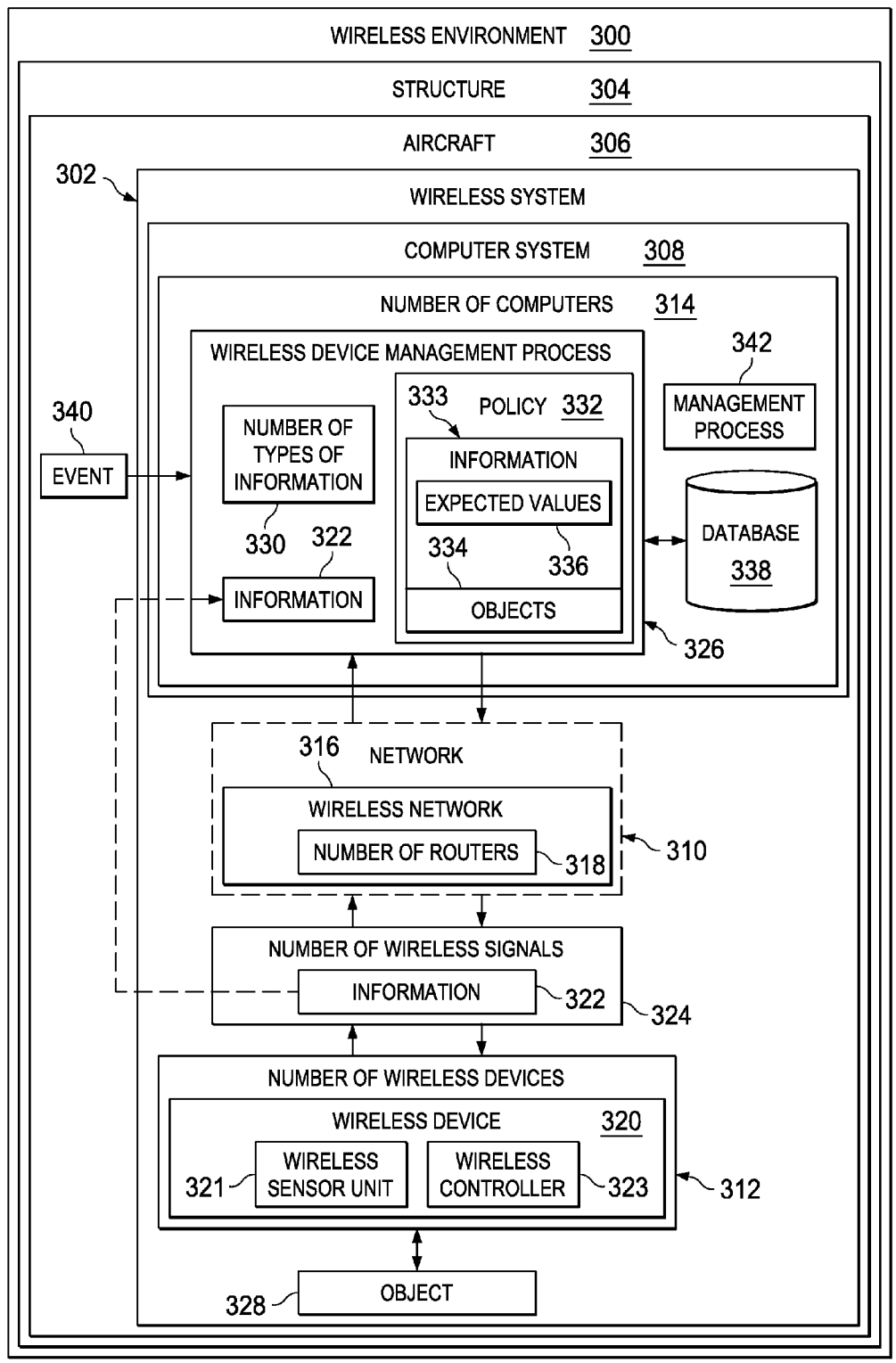
FIG. 3 is an illustration of a wireless environment in accordance with an advantageous embodiment.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, environmental control system 214, and wireless system 216. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1. A number, when referring to items, means one or more items. For example, a number of apparatus embodiments is one or more apparatus embodiments. A number of apparatus embodiments, method embodiments, or a combination thereof may be utilized while aircraft 200 is in service 112 and/or during maintenance and service 114 in FIG. 1. The use of a number of the different advantageous embodiments may substantially expedite the assembly of and/or reduce the cost of aircraft 200.

The different advantageous embodiments recognize and take into account a number of different considerations. For example, the different advantageous embodiments recognize and take into account that the use of wireless devices may reduce the weight of aircraft. The wires needed to connect devices to a computer system may be unnecessary. As a result, weight savings from reducing or eliminating the use of wires results in a reduction in the weight of the aircraft.

The different advantageous embodiments also recognize and take into account that the installation of wireless devices may also reduce the time and cost needed to manufacture an aircraft. For example, installation of wires and connection of devices to wires are unnecessary with wireless systems.

The different advantageous embodiments recognize and take into account, however, that with wireless devices, wires are not present to make an association between the device and the computer system to which the wireless devices send information. In other words, a wire is not present at a port of the computer system that leads to a particular device. Thus, the different advantageous embodiments recognize and take into account that wiring diagrams are not present for these systems.

Wireless sensors are one example of wireless devices. The different advantageous embodiments recognize and take into account that although a wireless sensor may be placed on or near an object, identifying data received from a wireless sensor as being for that particular wireless sensor monitoring the particular object may be difficult.

The different advantageous embodiments recognize and take into account that one solution may involve having an operator or maintenance person write down an identifier of each wireless sensor as the wireless sensor is installed. This identifier may be entered into a database or other collection of data to associate the wireless sensor with the object.

This type of process is prone to errors that may be made in writing down identifiers of sensors and their associated objects. As a result, the different placements of wireless sensors may be checked by another operator. Installing this type of system may be labor intensive. Additionally, maintenance of the sensor systems also may be labor intensive. For example, each time a sensor is replaced, the identifier for the sensor is again written down and entered into a database.

Thus, the different advantageous embodiments provide a method and apparatus for identifying wireless devices. Information is received from a wireless device that is unidentified. An object associated with the wireless device is identified using a number of types of information in the information and the information.

With reference now to FIG. 3, an illustration of a wireless environment is depicted in accordance with an advantageous embodiment. Wireless environment 300 is an example of an environment that may be implemented in aircraft 200 in FIG. 2.

In this illustrative example, wireless system 302 is implemented within structure 304. Structure 304 takes the form of aircraft 306. Aircraft 306 may be, for example, aircraft 200 in FIG. 2. Wireless system 302 is an example of one implementation for wireless system 216 in FIG. 2.

As illustrated, wireless system 302 includes computer system 308, network 310, and number of wireless devices 312. A wireless device is any device configured to send and/or receive wireless signals. Additionally, a wireless device is configured to operate without the use of wires for communications and/or for power.

In these illustrative examples, computer system 308 comprises number of computers 314. Network 310 takes the form of wireless network 316 in which wireless network 316 contains number of routers 318.

As depicted, wireless device 320 in number of wireless devices 312 sends information 322 to computer system 308 using number of wireless signals 324. In this particular example, wireless device 320 is an unidentified wireless device.

As depicted, wireless device 320 may take the form of, for example, wireless sensor unit 321, wireless controller 323, or some other suitable wireless device. Wireless sensor unit 321 may take the form of, for example, without limitation, a temperature sensor, a pressure sensor, a light sensor, an audio sensor, or some other suitable type of sensor unit.

Further, wireless controller 323 may be any device configured to perform a function in structure 304. In particular, wireless controller 323 may be configured to perform a function using object 328. Additionally, wireless controller 323 may be configured to perform the function in response to a number of commands.

For example, wireless controller 323 may take the form of a window-dimming controller. Wireless controller 323 may be associated with a window or group of windows in aircraft 306 and may receive commands to control the amount of dimming for the window or group of windows.

In another illustrative example, wireless controller 323 may be a controller configured to operate the volume in an in-flight entertainment system. Wireless controller 323 may be part of an environmental control system. Wireless controller 323 may be associated with an air vent that is movable to control airflow associated with an air vent. For example, wireless controller 323 may be used to control the flow of air through the vent in the environmental control system.

When information 322 is received from wireless device 320 at computer system 308, wireless device management process 326 identifies object 328 associated with wireless device 320. In these illustrative examples, wireless device management 326 may run on one or more of number of computers 314 in computer system 308.

Wireless device management process 326 identifies object 328 using number of types of information 330 and information 322. In these illustrative examples, wireless device management process 326 may identify object 328 by comparing number of types of information 330 and information 322 with policy 332. Policy 332 is a number of rules and also may include data. These rules and data are used to identify object 328 in these examples.

In these illustrative examples, number of types of information 330 and information 322 are compared to information 333 about objects 334 in policy 332. Information 333 about objects 334 may comprise expected values 336 for information about objects 334.

Number of types of information 330 may include at least one of information about the device, information about a number of routers routing the information, a type of wireless device data, characteristics of a number of wireless signals used to send the information, and other suitable types of information.

In these illustrative examples, object 328 may take a number of different forms. For example, object 328 may be selected from a group consisting of an air vent, an in-flight entertainment system, a landing gear, a tire, an engine inlet, an actuator, a portion of a passenger cabin, a passenger seat, a window, and/or other suitable types of objects. In some illustrative examples, number of objects 324 may include aircraft 306.

In these illustrative examples, after wireless device management process 326 identifies wireless device 320 in number of wireless devices 312, wireless device management process 326 associates wireless device 320 with object 328. This association may be made in database 338. Database 338 comprises associations of wireless devices and objects. Of course, the association may be stored in other types of data structures other than databases. For example, a text file or a table may be used.

In this manner, multiple wireless devices having the same part number may be distinguished from each other using wireless device management process 326. In particular, multiple wireless devices having the same part number may be used in different locations throughout structure 304 for different system functions within structure 304. Wireless device management process 326 uses information 322 and number of types of information 330 to distinguish these wireless devices from each other.

As another illustrative example, multiple wireless devices having the same part number may be associated with the same object. However, each of these wireless devices may be associated with a different function. These wireless devices associated with the same object may be distinguished using management process 342.

In these illustrative examples, the identification of wireless device 320 may be made in response to event 340. Event 340 may be a periodic event or a non-periodic event. Event 340 may be, for example, at least one of an installation of the wireless device, a movement of the wireless device from one location to another location, a receipt of information from the wireless device, a user input, and other suitable types of events.

The illustration of sensor environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, database 338 may be in a location remote to computer system 308. Additionally, in other advantageous embodiments, wireless system 302 may be implemented within a structure other than aircraft 306. For example, without limitation, wireless system 302 may be implemented within a spacecraft, a satellite, a submarine, a surface ship, an automobile, a tank, a truck, a power plant, an elevator system, and/or other suitable types of structures.

Figure 4:
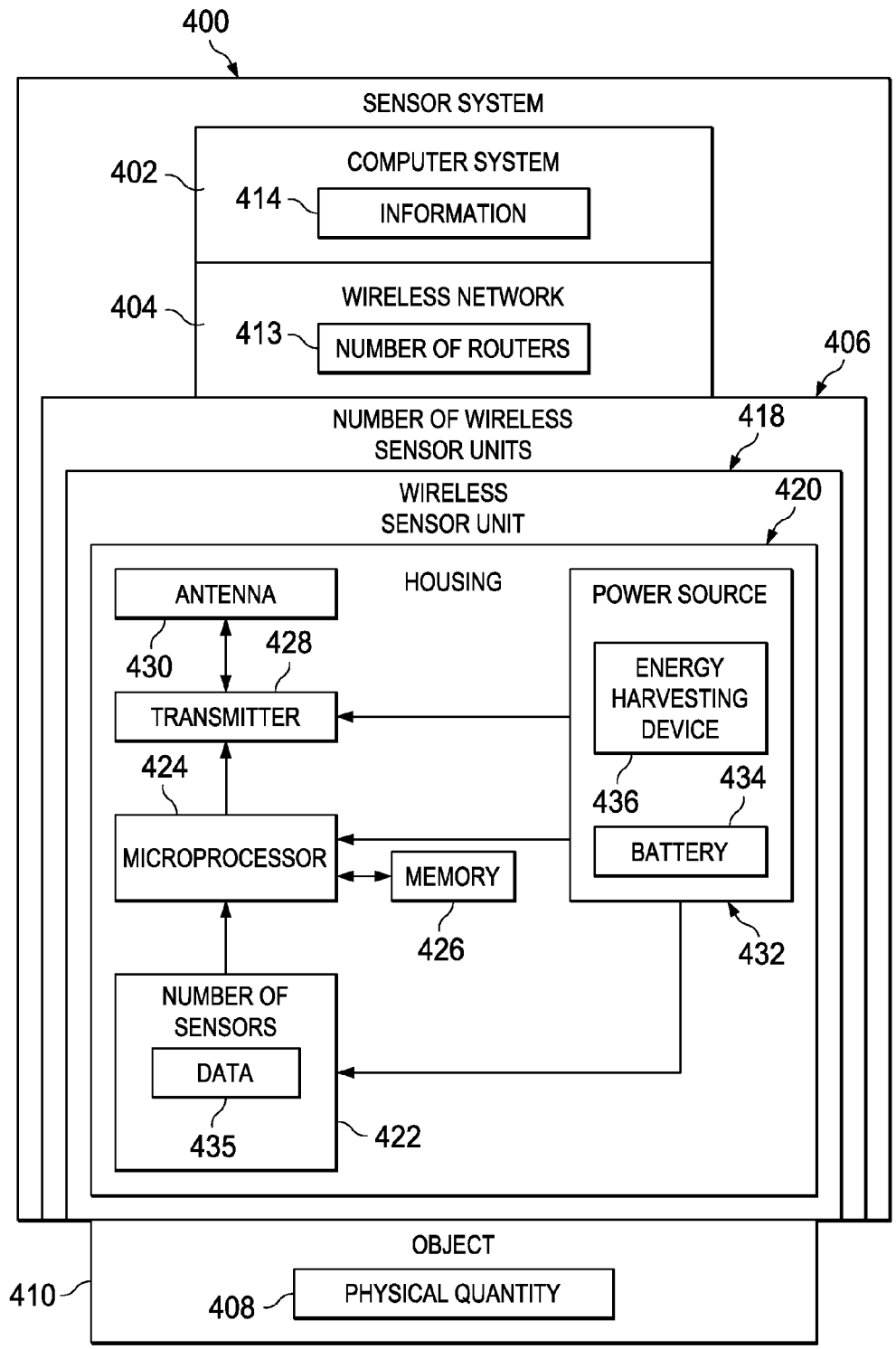
FIG. 4 is an illustration of a sensor system in accordance with an advantageous embodiment.

With reference now to FIG. 4, an illustration of a sensor system is depicted in accordance with an advantageous embodiment. In this illustrative example, sensor system 400 is an example of one implementation for wireless system 302 in FIG. 3.

As depicted, sensor system 400 includes computer system 402, wireless network 404, and number of wireless sensor units 406. Number of wireless sensor units 406 is an example of one implementation for number of wireless devices 312 in FIG. 3. Number of wireless sensor units 406 detects physical quantity 408 in object 410.

In these examples, computer system 402 may include any device that is capable of receiving and storing information

414. Information 414 is received from number of wireless sensor units 406 measuring physical quantity 408 of object 410. Computer system 402 may take the form of a number of computers, a controller, and/or other suitable devices.

In these examples, computer system 402 is associated with number of wireless sensor units 406 through wireless network 404. Wireless network 404 includes number of routers 413.

As depicted in this example, number of wireless sensor units 406 includes wireless sensor unit 418. Wireless sensor unit 418 is an example of one implementation for wireless sensor unit 321 in FIG. 3. In this illustrative example, wireless sensor unit 418 includes housing 420, which contains number of sensors 422, microprocessor 424, memory 426, transmitter 428, antenna 430, and power source 432.

Data 435 is generated by number of sensors 422. Data 435 may be temporarily stored in memory 426 until transmitted by transmitter 428 over antenna 430 to number of routers 413 in wireless network 404. In this manner, number of routers 413 sends data 435 to computer system 402 to be stored as information 414.

In these examples, transmitter 428 transmits wireless signals over antenna 430 in the form of radio frequency signals. Further, in some illustrative examples, transmitter 428 also may be associated with a unique identification number that is included with a transmitted data packet to distinguish between different sensors and/or identify sensor locations.

Microprocessor 424 controls the sampling or receipt of data 435 from number of sensors 422. Microprocessor 424 may be configured to obtain and transmit data 435 from number of sensors 422 based on an event.

These events may be periodic or non-periodic. For example, in an aircraft, the periodic event may be a schedule in which cabin air temperature is sensed every 10 seconds. In other advantageous embodiments, data 435 may be sensed by an external event, such as the physical opening of a door.

Further, wireless sensor unit 418 also may send data 435 based on these events and also send data at least periodically to indicate that the sensor is still alive.

Number of sensors 422 may include sensors of various forms. For example, without limitation, number of sensors 422 may include at least one of a thermometer, a thermistor, an ohm meter, an ammeter, a volt meter, a Hall effect device, an altimeter, a pressure sensor, a gas flow sensor, an oxygen sensor, a carbon monoxide sensor, a photocell, an infrared sensor, a microphone, a hydrophone, a motion sensor, and other suitable types of sensor.

In these examples, power source 432 provides power to transmitter 428, microprocessor 424, memory 426, and number of sensors 422 for the various operations that are needed. In some illustrative examples, power source 432 may be connected only to selected components, while other components may be provided power through connections to the power components.

Power source 432 may be, for example, battery 434 and/or energy harvesting device 436. Energy harvesting device 436 may be, for example, a photovoltaic device that generates electrical power when exposed to a light source, such as sunlight or cabin lighting. In other embodiments, energy harvesting device 436 may be, for example, a vibration harvesting device. This type of device may be, for example, a cantilevered piezoelectric beam, which generates electrical power when exposed to aircraft or operational vibration.

Another non-limiting example of an implementation for energy harvesting device 436 is a thermoelectric device. This type of device generates electrical power when exposed to a thermal gradient. This thermal gradient may be, for example, a hot hydraulic line in ambient air or a thermal gradient across an aircraft insulation blanket.

Energy harvesting device 436 may provide power when various conditions are present. The collusion of battery 434 may provide power to wireless sensor unit 418 if other conditions are not present to allow energy harvesting device 436 to generate power. Further, energy harvesting device 436 also may charge battery 434.

In some applications, a capacitor or a super-capacitor may be used in lieu of battery 434 to provide power to the various components. This capacitor or super-capacitor may be used in collusion with energy harvesting device 436.

In this manner, wireless sensor unit 418 may not require any wiring in the aircraft. Further, no aircraft power or data wiring is required for the normal operation of these devices. As a result, power requirements and weight from wiring sensors are not incurred. This type of wireless sensor also allows for easier changes to the locations of sensors when reconfiguring the aircraft. Further, the use of this type of sensor makes sensor networks to already existing aircraft easier.

In these illustrative examples, the wireless sensors are configured in a star network topology in which the different wireless sensors send data to a central node, such as one of number of routers 413. The routers are configured in a wireless mesh network configuration. This configuration provides at least two pathways of communication to each node and may send information back and forth. Further, routes are created between nodes only as needed to transmit information. Of course, in other advantageous embodiments, the wireless sensor units and the routers may be configured in some other suitable manner.

The illustration of sensor system 400 in FIG. 4 is not meant to imply architectural limitations to the manner in which sensor system 400 may be implemented. For example, in some advantageous embodiments, more than one object 410 may be associated with wireless sensor unit 418. As another example, in some advantageous embodiments, wireless sensor unit 418 may not include memory 426.

Additionally, in some illustrative examples, a portion of number of wireless sensor units 406 may be configured to send data 435 directly to computer system 402 without using number of routers 413.

Figure 5:
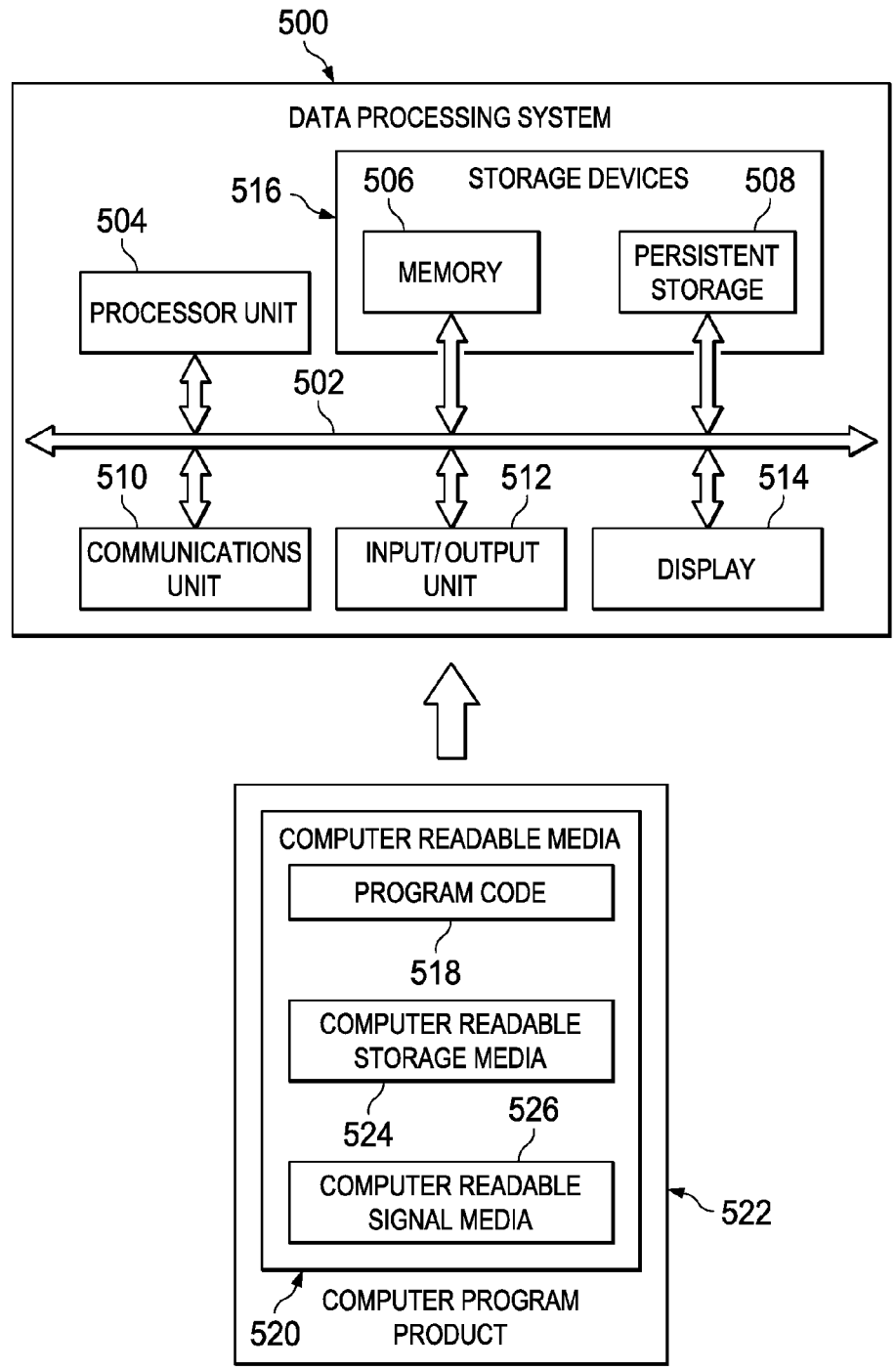
FIG. 5 is an illustration of a data processing system in accordance with an advantageous embodiment.

Turning now to FIG. 5, an illustration of a data processing system is depicted in accordance with an advantageous embodiment. In this illustrative example, data processing system 500 is an example of one implementation for a computer in computer system 308 in FIG. 3 and/or computer system 402 in FIG. 2.

Data processing system 500 includes communications fabric 502, which provides communications between processor unit 504, memory 506, persistent storage 508, communications unit 510, input/output (I/O) unit 512, and display 514.

Processor unit 504 serves to execute instructions for software that may be loaded into memory 506. Processor unit 504 may be a number of processors, a multi-processor core, or some other type of processor, depending on the particular implementation. A number, as used herein with reference to an item, means one or more items. Further, processor unit 504 may be implemented using a number of heterogeneous processor systems in which a main processor is present with secondary processors on a single chip. As another illustrative example, processor unit 504 may be a symmetric multi-processor system containing multiple processors of the same type.

Memory 506 and persistent storage 508 are examples of storage devices 516. A storage device is any piece of hardware that is capable of storing information, such as, for example, without limitation, data, program code in functional form, and/or other suitable information either on a temporary basis and/or a permanent basis. Storage devices 516 may also be referred to as computer readable storage devices in these examples. Memory 506, in these examples, may be, for example, a random access memory or any other suitable volatile or non-volatile storage device. Persistent storage 508 may take various forms, depending on the particular implementation.

For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these examples, provides for communications with other data processing systems or devices. In these examples, communications unit 510 is a network interface card. Communications unit 510 may provide communications through the use of either or both physical and wireless communications links.

Input/output unit 512 allows for input and output of data with other devices that may be connected to data processing system 500. For example, input/output unit 512 may provide a connection for user input through a keyboard, a mouse, and/or some other suitable input device. Further, input/output unit 512 may send output to a printer. Display 514 provides a mechanism to display information to a user.

Instructions for the operating system, applications, and/or programs may be located in storage devices 516, which are in communication with processor unit 504 through communications fabric 502. In these illustrative examples, the instructions are in a functional form on persistent storage 508. These instructions may be loaded into memory 506 for execution by processor unit 504. The processes of the different embodiments may be performed by processor unit 504 using computer implemented instructions, which may be located in a memory, such as memory 506.

These instructions are referred to as program code, computer usable program code, or computer readable program code that may be read and executed by a processor in processor unit 504. The program code in the different embodiments may be embodied on different physical or computer readable storage media, such as memory 506 or persistent storage 508.

Program code 518 is located in a functional form on computer readable media 520 that is selectively removable and may be loaded onto or transferred to data processing system 500 for execution by processor unit 504. Program code 518 and computer readable media 520 form computer program product 522 in these examples. In one example, computer readable media 520 may be computer readable storage media 524 or computer readable signal media 526.

Computer readable storage media 524 may include, for example, an optical or magnetic disk that is inserted or placed into a drive or other device that is part of persistent storage 508 for transfer onto a storage device, such as a hard drive, that is part of persistent storage 508. Computer readable storage media 524 also may take the form of a persistent storage, such as a hard drive, a thumb drive, or a flash memory, that is connected to data processing system 500. In some instances, computer readable storage media 524 may not be removable from data processing system 500. In these illustrative examples, computer readable storage media 524 is a non-transitory computer readable storage medium.

Alternatively, program code 518 may be transferred to data processing system 500 using computer readable signal media 526. Computer readable signal media 526 may be, for example, a propagated data signal containing program code 518. For example, computer readable signal media 526 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 518 may be downloaded over a network to persistent storage 508 from another device or data processing system through computer readable signal media 526 for use within data processing system 500. For instance, program code stored in a computer readable storage medium in a server data processing system may be downloaded over a network from the server to data processing system 500. The data processing system providing program code 518 may be a server computer, a client computer, or some other device capable of storing and transmitting program code 518.

The different components illustrated for data processing system 500 are not meant to provide architectural limitations to the manner in which different embodiments may be implemented. The different advantageous embodiments may be implemented in a data processing system including components in addition to, or in place of, those illustrated for data processing system 500. Other components shown in FIG. 5 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 500 is any hardware apparatus that may store data. Memory 506, persistent storage 508, and computer readable media 520 are examples of storage devices in a tangible form.

In another example, a bus system may be used to implement communications fabric 502 and may be comprised of one or more buses, such as a system bus or an input/output bus. Of course, the bus system may be implemented using any suitable type of architecture that provides for a transfer of data between different components or devices attached to the bus system.

Additionally, a communications unit may include one or more devices used to transmit and receive data, such as a modem or a network adapter. Further, a memory may be, for example, memory 506, or a cache, such as found in an interface and memory controller hub that may be present in communications fabric 502.

Figure 6:
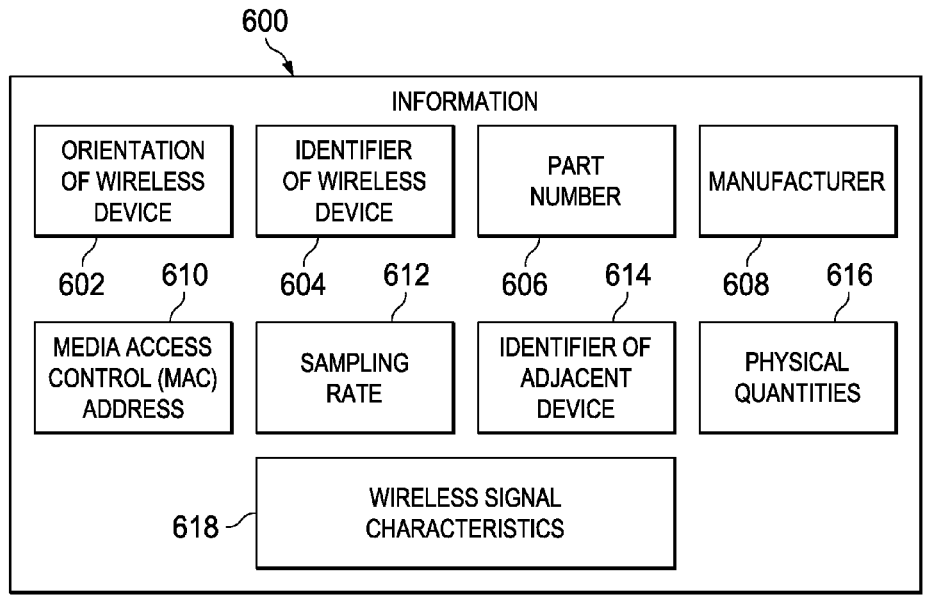
FIG. 6 is an illustration of information that may be received from a wireless sensor unit in accordance with an advantageous embodiment.

With reference now to FIG. 6, an illustration of information that may be received from a wireless device is depicted in accordance with an advantageous embodiment. In this illustrative example, information 600 is an example of one implementation for information 322 in FIG. 3 and/or information 414 in FIG. 4.

As depicted in this example, information 600 may include at least one of orientation of wireless device 602, identifier of wireless device 604, part number 606, manufacturer 608, media access control (MAC) address 610, sampling rate 612, identifier of adjacent device 614, physical quantities 616, wireless signal characteristics 618 and other types of information. Physical quantities 616 include, for example, the data generated by the wireless device for the object associated with the sensor unit.

In this illustrative example, wireless signal characteristics 618 are the characteristics associated with the wireless signal generated by the wireless device. For example, without limitation, wireless signal characteristics 618 may include a strength of the wireless signal, a bandwidth of the signal, and/or other suitable characteristics for the wireless signal.

As one illustrative example, a wireless device may generate a wireless signal with information 600. A router receives this wireless signal and processes information 600 before routing the wireless signal with information 600 to, for example, computer system 308 in FIG. 3. In processing information 600, the router may generate wireless signal characteristics 618. Wireless signal characteristics 618 are added to information 608 and sent to the computer system. In this manner, at least a portion of information 600 may be generated by the router based on the information received from the wireless device.

In some illustrative examples, some portions of information 600 may be received only once by the computer system. Other portions of information 600 may be received periodically and/or in response to some event. Additionally, some portions of information 600 may be received more often than other portions of information 600.

For example, identifier of wireless device 604, part number 606, and manufacturer 608 may only be sent to the computer system by the wireless sensor unit once after the wireless sensor unit is initiated. However, orientation of wireless device 602, media access control (MAC) address 610, sampling rate 612, identifier of adjacent device 614, and physical quantities 616 may be sent to the computer system periodically.

Figure 7:
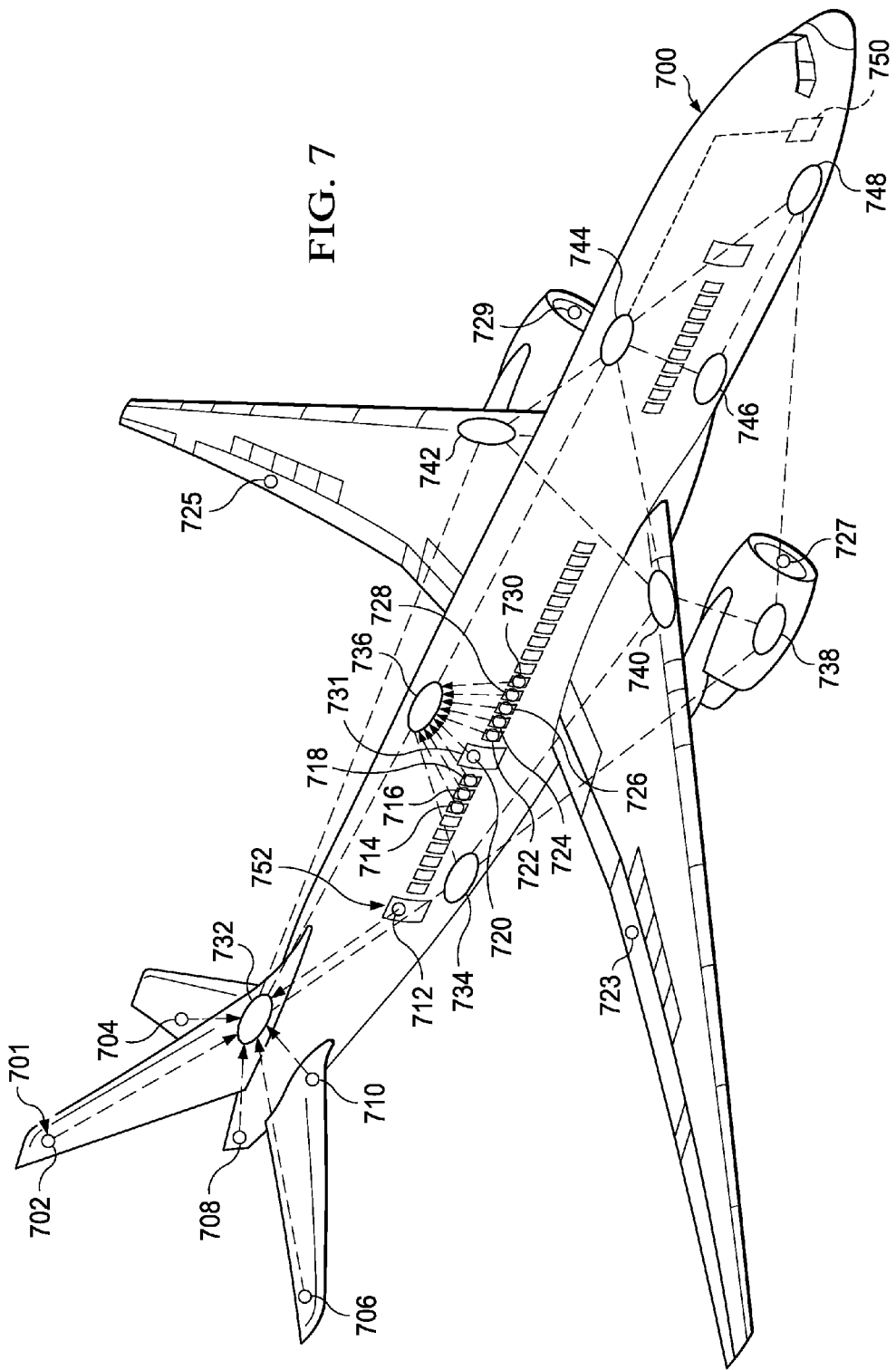
FIG. 7 is an illustration of an exposed perspective view of an aircraft with a sensor system in accordance with an advantageous embodiment.

With reference now to FIG. 7, an illustration of an exposed perspective view of an aircraft with a sensor system is depicted in accordance with an advantageous embodiment. In this illustrative example, aircraft 700 is an example of one implementation for aircraft 200 in FIG. 2 and aircraft 306 in FIG. 3. Aircraft 700 includes sensor system 701, which is an example of one implementation for sensor system 216 in FIG. 2 and sensor system 302 in FIG. 3.

As depicted, sensor system 701 includes wireless sensor units 702, 704, 706, 708, 710, 712, 714, 716, 718, 720, 722, 723, 724, 725, 726, 727, 728, 729, and 730. Sensor system 701 also includes wireless routers 732, 734, 736, 738, 740, 742, 744, 746, and 748.

As can be seen, the different wireless sensor units may be located inside and outside of the aircraft. In these examples, wireless sensor units 702, 704, 706, 708, 710, 712, 723, 725, 727, and 729 are located on the exterior of aircraft 700. Wireless sensor units 714, 716, 718, 720, 722, 724, 726, 728, and 730 are located on the interior of the aircraft. In this illustrative example, wireless sensor units 714, 716, 718, 720, 722, 724, 726, 728, and 730 may be motion sensors configured to detect movement within the passenger cabin of aircraft 700.

As one illustrative example, wireless sensor unit 720 is configured to detect when door 731 is open. As another illustrative example, wireless sensor unit 723 and wireless sensor unit 725 are configured to detect movement of actuators associated with the flaps on the wings of aircraft 700. Wireless sensor unit 727 and wireless sensor unit 729 are configured to detect air pressure within the engine inlets for aircraft 700.

Additionally, the different wireless routers may be located on the interior or exterior of the aircraft, depending on the particular implementation. In these examples, wireless routers 732, 738, 740, 742 and 748 are located on the exterior of aircraft 700. Wireless routers 734, 736, 744, and 746 are located inside the aircraft.

In this illustrative example, interior locations in the aircraft may include, for example, the passenger cabin, cabin ceiling areas, cargo holds, and electrical equipment centers. Exterior locations may include, for example, landing gear wheel wells, engine struts, or within the empennage.

The wireless sensor units send information to computer system 750 in aircraft 700 using wireless network 752 formed by wireless routers 732, 734, 736, 738, 740, 742, 744, 746, and 748. As depicted, a wireless router in wireless network 752 may receive information from more than one wireless sensor unit. Further, a wireless router may receive information from other wireless routers.

Although aircraft 700 has been depicted with wireless sensor units, aircraft 700 may also include wireless controllers. For example, aircraft 700 may include a number of wireless controllers associated with the interior of the windows for aircraft 700. These wireless controllers may be part of a window-dimming system.

With reference now to FIG. 8, an illustration of a table for routing information received from wireless sensor units is depicted in accordance with an advantageous embodiment. In this illustrative example, table 800 identifies a set of rules for routing information received from different wireless sensor units to different devices for processing.

As depicted, table 800 includes functional identifier 802, function 804, matching criteria 806, and route to 808. Functional identifier 802 identifies, for example, the type of function that the particular wireless sensor unit performs. Functional identifier 802 may not be the unique identifier for the wireless sensor unit provided by the wireless sensor unit in this depicted example.

Function 804 identifies the function that the particular wireless sensor unit performs. Function 804 may be associated with the object with which the wireless sensor unit is associated.

In this illustrative example, matching criteria 806 identifies information for wireless sensor units that may be used to identify a wireless sensor unit when compared to the information received from the wireless sensor unit. Route to 808 identifies the device to which information received from the wireless sensor units is to be routed based on the identification of the wireless sensor unit.

For example, a wireless sensor unit on an aircraft may send information that includes a unique identifier for the wireless sensor unit, a manufacturer for the wireless sensor unit, a part number for the wireless sensor unit, a number of data types for the data generated by the wireless sensor unit, and an orientation of the wireless sensor unit. The orientation may be with respect to gravity.

In one illustrative example, a wireless sensor unit sends a wireless signal containing the following information:
  Unique Identifier="10.1.124.5.32.5",
  Manufacturer="XYZ Corp",
  Part No="123-4321",
  Data Types=("temp" and "pressure"), and
  Gravitational Orientation=(0.432, 0, 0.902).

In this illustrative example, the wireless signal containing this information is received by a number of routers in the aircraft. The aircraft may include a right wing router, a left wing router, a forward cabin router, and a mid cabin router. An aft cabin router in the aircraft does not receive the wireless signal containing the information.

The routers that receive the wireless signal report a received signal strength indication (RSSI) for the wireless signal identified by the unique identifier. These reports are received by the computer system processing the information received through the routers.

The right wing router reports a received signal strength indication of about −82 decibels. The left wing router reports a received signal strength indication of about −52 decibels. The forward cabin router reports a received signal strength indication of about −71 decibels. The mid cabin router reports a received signal strength indication of about −76 decibels.

The wireless sensor unit with unique identifier 10.1.124.5.32.5 only matches the criteria in matching criteria 806 for the functional identifier, S1234 810, in function identifier 802. As a result, the computer system associates the wireless sensor unit with unique identifier 10.1.124.5.32.5 with the functional identifier, function, and route to device for S1234 810. Additionally, the computer system associates the wireless sensor unit with unique identifier 10.1.124.5.32.5 with the left bleed air duct in the aircraft. In this manner, any future information received from the wireless sensor unit with unique identifier 10.1.124.5.32.5 is associated with the functional identifier, S1234 810, and the left bleed air duct. Further, the information is routed to the cabin pressurization control unit in the aircraft.

Of course in other illustrative embodiments, a table similar to table 800 presented in FIG. 8 may be used for other types of wireless devices other than wireless sensor units.

Figure 9:
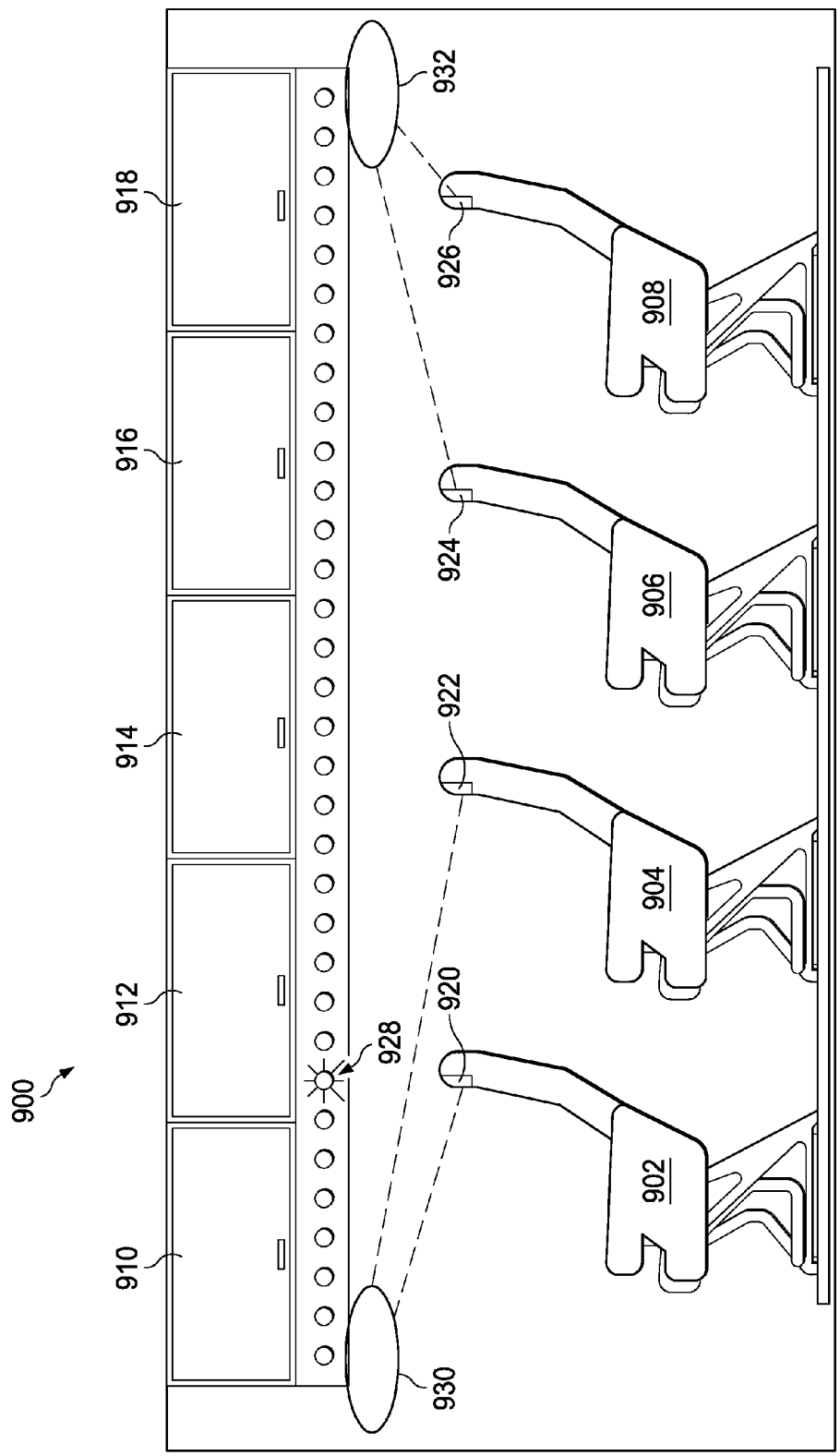
FIG. 9 is an illustration of a portion of a passenger cabin in an aircraft in accordance with an advantageous embodiment.

With reference now to FIG. 9, an illustration of a portion of a passenger cabin in an aircraft is depicted in accordance with an advantageous embodiment. In this illustrative example, passenger cabin 900 may be a passenger cabin in aircraft 200 in FIG. 2 and/or aircraft 306 in FIG. 3.

As depicted in this example, passenger cabin 900 includes seats 902, 904, 906, and 908. Storage bins 910, 912, 914, 916, and 918 are located above seats 902, 904, 906, and 908, respectively.

Wireless sensor unit 920 is located in seat 902. Sensor 922 is located on seat 904. Wireless sensor unit 924 is located on seat 906. Wireless sensor unit 926 is located on seat 908. These wireless sensor units are configured to detect the presence of light radiating from lights 928 above the seats.

Wireless sensor unit 920 and wireless sensor unit 922 may send information to router 930 located near storage bin 910. Wireless sensor unit 924 and wireless sensor unit 926 may send information to router 932 located near storage bin 918. In this illustrative example, router 930 and router 932 may send the information received from the wireless sensor units to a computer system in the aircraft.

In these illustrative examples, the computer system uses the information received from the wireless sensor units to identify the objects associated with the wireless sensors units. As one illustrative example, the computer system receives information from a wireless sensor unit. The computer system uses the router path for the information received to identify the wireless sensor unit and the object associated with the wireless sensor unit.

For example, the computer system identifies information received through router 930 as coming from either wireless sensor unit 920 or wireless sensor unit 922. With this information, the computer system identifies the object associated with the wireless sensor unit as one of seat 902 and seat 904. The computer system may then use other portions of the information received and/or a database of information to determine whether the information received came from wireless sensor unit 920 on seat 902 or wireless sensor unit 922 on seat 904.

Figure 10:
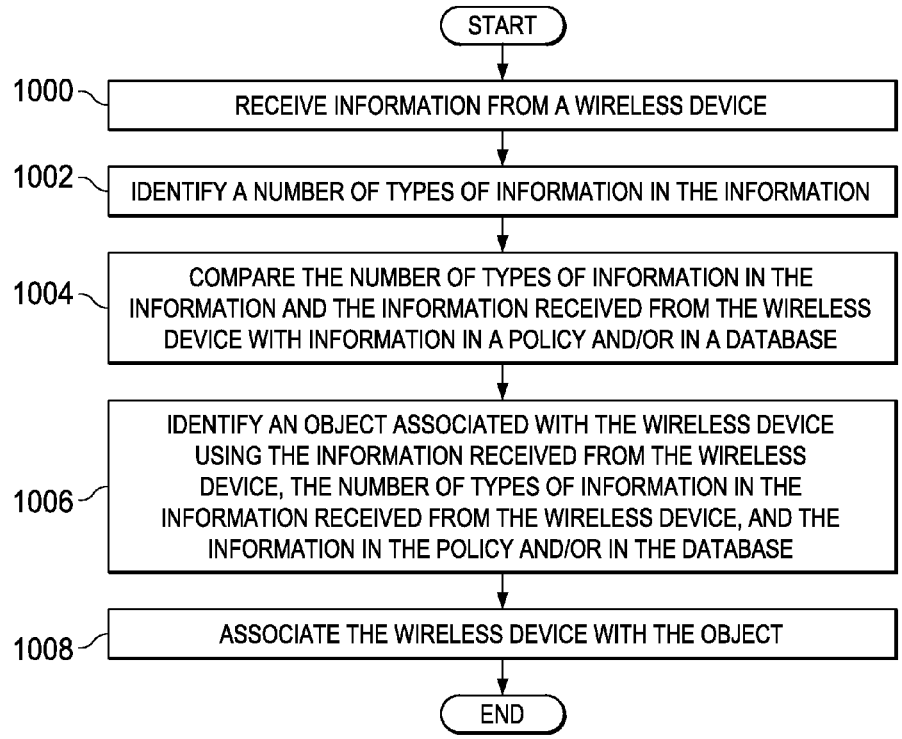
FIG. 10 is an illustration of a flowchart of a process for identifying wireless devices in accordance with an advantageous embodiment.

With reference now to FIG. 10, an illustration of a flowchart of a process for identifying wireless devices is depicted in accordance with an advantageous embodiment. The process illustrated in FIG. 10 may be implemented using wireless device management process 326 in FIG. 3 to identify wireless devices within number of wireless devices 312 in FIG. 3.

The process begins by receiving information from a wireless device (operation 1000). The wireless device may be, for example, located within an aircraft, such as aircraft 200 in FIG. 2, aircraft 306 in FIG. 3, and/or aircraft 700 in FIG. 7. The process then identifies a number of types of information in the information (operation 1002).

Thereafter, the process compares the number of types of information in the information and the information received from the wireless device with information in a policy and/or in a database (operation 1004). The information in the policy may be information about objects within the aircraft. Further, the policy may include a set of rules for comparing the number of types of information and the information received from the wireless device with the information in the policy.

The information in the database may be information associating wireless devices with objects. These associations are based on prior identifications of wireless devices and the objects associated with the wireless devices.

The process then identifies an object associated with the wireless device using the information received from the wireless device, the number of types of information in the information received from the wireless device, and the information in the policy and/or in the database (operation 1006).

Thereafter, the process associates the wireless device with the object (operation 1008), with the process terminating thereafter. In operation 1008, the association is stored in the database. In some illustrative examples, associations of wireless devices with objects may be stored in some other suitable type of data structure, such as, for example, without limitation, a text file or a spreadsheet.

The flowchart and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different advantageous embodiments provide a method and apparatus for identifying sensors. Information is received from a wireless sensor that is unidentified. An object associated with the wireless sensor is identified using a number of types of information in the information and the information.

The different advantageous embodiments can take the form of an entirely hardware embodiment, an entirely software embodiment, or an embodiment containing both hardware and software elements. Some embodiments are implemented in software, which includes, but is not limited to, forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories, which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems, remote printers, or storage devices through intervening private or public networks. Non-limiting examples are modems and network adapters, and are just a few of the currently available types of communications adapters.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for identifying wireless devices in an aircraft, the method comprising:

receiving information from each wireless device in a plurality of wireless devices in the aircraft, wherein the plurality of wireless devices include at least one of wireless sensor units and wireless controllers, and wherein the wireless sensor units measure physical quantities of a first portion of tangible objects within the aircraft and the wireless controllers perform functions on a second portion of the tangible objects in the aircraft based on commands sent to the wireless controllers;

individually identifying each wireless device in the plurality of wireless devices using the information;

identifying a single tangible object in the tangible objects that is associated with a portion of the plurality of wireless devices using the information and one or more categories of information in the information;

associating each wireless device in the portion of the plurality of wireless devices with the single tangible object after identifying the single tangible object in the tangible objects that is associated with the portion of the plurality of wireless devices, wherein associations are formed supporting airplane functions for at least one of measuring physical quantities of the single tangible object and performing functions on the single tangible object;

storing the associations between each wireless device in the portion of the plurality of wireless devices and the single tangible object; and distinguishing each wireless device in the plurality of wireless devices having a conflict with another wireless device in the plurality of wireless devices using the information and the one or more categories of information in the information, wherein the conflict is with the associations.

2. The method of claim 1, wherein the conflict comprises having a same part number; and wherein at least one of the information and the one or more categories of information in the information comprises, for each wireless device in the plurality of wireless devices having a conflict, at least one of a location, a function, and a unique identifier.

3. The method of claim 1, wherein the step of identifying the single tangible object in the tangible objects that is associated with the portion of the plurality of wireless devices using the information and the one or more categories of information in the information comprises:

identifying the single tangible object in the tangible objects that is associated with the portion of the plurality of wireless devices using the one or more categories of information in the information, the information, and a policy for associating tangible objects with wireless devices.

4. The method of claim 3, wherein the step of identifying the single tangible object in the tangible objects that is associated with the portion of the plurality of wireless devices using the one or more categories of information in the information, the information, and the policy for associating the tangible objects with the wireless devices comprises:

comparing the information and the one or more categories of information in the information to information about the tangible objects in the policy, wherein the information about the tangible objects in the policy includes expected values for the information for the tangible objects; and identifying the single tangible object in the tangible objects in the policy using a number of rules in the policy.

5. The method of claim 1, wherein receiving the information from the each wireless device in the plurality of wireless devices occurs through a direct wireless connection between the each wireless device in the plurality of wireless devices and a data processing system.

6. The method of claim 1, further comprising:
identifying the single tangible object in the tangible objects that is associated with a wireless device in the portion of the plurality of wireless devices using the information and the one or more categories of information in the information in response to an event selected from at least one of an installation of the wireless device, a movement of the wireless device from one location to another location, a receipt of the information from the wireless device, and a user input.

7. The method of claim 1, wherein the information is received from the each wireless device in the plurality of wireless devices through a wireless network consisting of a router.

8. The method of claim 1, wherein the one or more categories of information in the information comprise at least one of information about a wireless device in the portion of the plurality of wireless devices, information about a number of routers routing the information about the wireless device, a type of wireless device data, and characteristics of a number of wireless signals used to send the information about the wireless device.

9. The method of claim 1, wherein a portion of the information from a wireless device in the plurality of wireless devices comprises at least one of data generated from a number of measurements made by the wireless device, an orientation of the wireless device with respect to gravity, a location of the wireless device, an identifier for the wireless device, a media access control address for the wireless device, a part number, a manufacturer, a sampling rate, and an identifier of an adjacent device.

10. The method of claim 1, wherein the single tangible object is selected from a group comprising an air vent, an in-flight entertainment system, a landing gear, a tire, an engine inlet, an actuator, a portion of a passenger cabin, and a passenger seat.

11. An apparatus comprising:
a processor unit;
a storage device; and
program code, stored on the storage device, wherein the processor unit is configured to run the program code to:
receive information from each wireless device in a plurality of wireless devices in an aircraft, wherein the plurality of wireless devices include at least one of wireless sensor units and wireless controllers, and wherein the wireless sensor units measure physical quantities of a first portion of tangible objects within the aircraft and the wireless controllers perform functions on a second portion of the tangible objects in the aircraft based on commands sent to the wireless controllers;
individually identify each wireless device in the plurality of wireless devices using the information;
identify a single tangible object in the tangible objects that is associated with a portion of the plurality of wireless devices using the information and one or more categories of information in the information;
associate each wireless device in the portion of the plurality of wireless devices with the single tangible object after identifying the single tangible object in the tangible objects that is associated with the portion of the plurality of wireless devices, wherein associations are formed supporting airplane functions for at least one of measuring physical quantities of the single tangible object and performing functions on the single tangible object;
store the associations between each wireless device in the portion of the plurality of wireless devices and the single tangible object; and
distinguish each wireless device in the plurality of wireless devices having a conflict with another wireless device in the plurality of wireless devices using the information and the one or more categories of information in the information, wherein the conflict is with the associations.

12. The apparatus of claim 11:
wherein the conflict comprises having a same part number; and
wherein at least one of the information and the one or more categories of information in the information comprises, for each wireless device in the plurality of wireless devices having a conflict, at least one of a location, a function, and a unique identifier.

13. The apparatus of claim 11, wherein in being configured to run the program code to identify the single tangible object in the tangible objects that is associated with the portion of the plurality of wireless devices using the information and the one or more categories of information in the information, the processor unit is configured to run the program code to identify the single tangible object in the tangible objects that is associated with the portion of the plurality of wireless devices using the one or more categories of information in the information, the information, and a policy for associating tangible objects with wireless devices.

14. The apparatus of claim 13, wherein in being configured to run the program code to identify the single tangible object in the tangible objects that is associated with the portion of the plurality of wireless devices using the one or more categories of information in the information, the information, and the policy for associating the tangible objects with the wireless devices, the processor unit is configured to run the program code to compare the information and the one or more categories of information in the information to information about the tangible objects in the policy; and identify the single tangible object in the tangible objects in the policy using a number of rules in the policy, wherein the information about the tangible objects in the policy includes expected values for the information for the tangible objects.

15. The apparatus of claim 11, wherein the processor unit is configured to run the program code to identify the single tangible object in the tangible objects that is associated with a wireless device in the portion of the wireless devices using the information and one or more categories of information in the information in response to an event selected from at least one of an installation of the wireless device, a movement of the wireless device from one location to another location, a receipt of the information from the wireless device, and a user input.

16. The apparatus of claim 11, wherein in being configured to run the program code to receive the information from the each wireless device in the plurality of wireless devices, the processor unit is configured to run the program code to receive the information from the each wireless device in the plurality of wireless devices through a direct wireless connection between the each wireless device in the plurality of wireless devices and a data processing system.

17. The apparatus of claim 11, wherein the one or more categories of information in the information comprise at least one of information about a wireless device in the portion of the plurality of wireless devices, information about a number of routers routing the information about the wireless device, a type of wireless device data, and characteristics of a number of wireless signals used to send the information about the wireless device.

18. The apparatus of claim 11, wherein a portion of the information from a wireless device in the plurality of wireless devices comprises at least one of data generated from a number of measurements made by the wireless device, an orientation of the wireless device with respect to gravity, a location of the wireless device in the plurality of wireless devices, an identifier for the wireless device, a media access control address for the wireless device, a part number, a manufacturer, a sampling rate, expected values for the portion of the information for the single tangible object, and an identifier of an adjacent device.

19. A computer program product for identifying wireless devices in an aircraft comprising:
- a non-transitory computer readable storage medium; and
- program code, stored on the non-transitory computer readable storage medium, for receiving information from each wireless device in a plurality of wireless devices in the aircraft, wherein the plurality of wireless devices include at least one of wireless sensor units and wireless controllers, and wherein the wireless sensor units measure physical quantities of a first portion of tangible objects within the aircraft and the wireless controllers perform functions on a second portion of the tangible objects in the aircraft based on commands sent to the wireless controllers;
- program code, stored on the non-transitory computer readable storage medium, for individually identifying each wireless device in the plurality of wireless devices using the information;
- program code, stored on the non-transitory computer readable storage medium, for identifying a single tangible object in the tangible objects that is associated with a portion of the plurality of wireless devices using the information and one or more categories of information in the information;
- program code, stored on the non-transitory computer readable storage medium, for associating each wireless device in the portion of the plurality of wireless devices with the single tangible object after identifying the single tangible object in the tangible objects that is associated with the portion of the plurality of wireless devices, wherein associations are formed supporting airplane functions for at least one of measuring physical quantities of the single tangible object and performing functions on the single tangible object;
- program code, stored on the non-transitory computer readable storage medium, for storing the associations between each wireless device in the portion of the plurality of wireless devices and the single tangible object; and
- program code, stored on the non-transitory computer readable storage medium, for distinguishing each wireless device in the plurality of wireless devices having a conflict with another wireless device in the plurality of wireless devices using the information and the one or more categories of information in the information, wherein the conflict is with the associations.

20. The computer program product of claim 19:
wherein the conflict comprises having a same part number; and
wherein at least one of the information and the one or more categories of information in the information comprises, for each wireless device in the plurality of wireless devices having a conflict, at least one of a location, a function, and a unique identifier.

* * * * *